(12) United States Patent
Bifulco

(10) Patent No.: US 11,887,571 B2
(45) Date of Patent: Jan. 30, 2024

(54) ACOUSTIC ATTENUATION STRUCTURES

(71) Applicant: RAYTHEON TECHNOLOGIES CORPORATION, Farmington, CT (US)

(72) Inventor: Anthony R. Bifulco, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 362 days.

(21) Appl. No.: 17/038,556

(22) Filed: Sep. 30, 2020

(65) Prior Publication Data

US 2022/0084493 A1    Mar. 17, 2022

Related U.S. Application Data

(60) Provisional application No. 63/077,234, filed on Sep. 11, 2020.

(51) Int. Cl.
  *G10K 11/16*    (2006.01)
  *B64D 27/10*    (2006.01)
  (Continued)

(52) U.S. Cl.
  CPC .............. *G10K 11/16* (2013.01); *B64D 27/10* (2013.01); *B64D 29/00* (2013.01); *B64D 33/02* (2013.01);
  (Continued)

(58) Field of Classification Search
  CPC ........ G10K 11/16; B64D 27/10; B64D 29/00; B64D 33/02; B64D 2033/0206;
  (Continued)

(56) References Cited

U.S. PATENT DOCUMENTS 9,273,631 B2    3/2016    Vavalle
9,657,644 B2    5/2017    Sfarti et al.
(Continued)

FOREIGN PATENT DOCUMENTS

EP    1860283    11/2007
EP    2458162    5/2012
(Continued)

OTHER PUBLICATIONS

European Patent Office; Extended European Search Report dated May 11, 2022 in Application No. 21195790.7.
(Continued)

*Primary Examiner* — Woody A Lee, Jr.
*Assistant Examiner* — Eric A Lange
(74) *Attorney, Agent, or Firm* — SNELL & WILMER L.L.P.

(57) ABSTRACT

Acoustic structures for a gas turbine engine are disclosed. In various embodiments, the acoustic structures comprise a panel in the form of a cellular structure having a plurality of cells; and a housing configured to house the cellular structure, the housing including a first rail configured for attachment to a static structure within the gas turbine engine and a second rail configured for attachment to the static structure. In various embodiments, the acoustic structures comprise a liner in the form of a non-segmented or two-piece structure configured to extend about the inner barrel of a nacelle structure. The disclosed panels and liners are configured to maximize the operational area of the acoustic structures by eliminating obstructions from adjacent flow paths.

13 Claims, 7 Drawing Sheets

(51) Int. Cl.
  *B64D 29/00*   (2006.01)
  *B64D 33/02*   (2006.01)
  *F02C 7/045*   (2006.01)
  *F02C 7/24*    (2006.01)

(52) U.S. Cl.
  CPC ............... *F02C 7/045* (2013.01); *F02C 7/24* (2013.01); *B64D 2033/0206* (2013.01)

(58) Field of Classification Search
  CPC .. F02C 7/045; F02C 7/24; Y02T 50/60; F01D 9/02; F01D 25/24; F01D 25/246; F05D 2230/60; F05D 2250/283; F05D 2260/963; F02K 1/827
  See application file for complete search history.

(56) References Cited

U.S. PATENT DOCUMENTS

| | | | |
|---|---|---|---|
| 9,951,954 B2 | 4/2018 | Benson et al. | |
| 10,465,707 B2 | 11/2019 | Care et al. | |
| 10,612,564 B2 | 4/2020 | Heeter et al. | |
| 10,723,476 B2* | 7/2020 | Zaccardi | B64D 33/06 |
| 2003/0031556 A1* | 2/2003 | Mulcaire | F01D 9/041 |
| | | | 415/119 |
| 2007/0036644 A1* | 2/2007 | Harper | F02K 3/06 |
| | | | 415/173.1 |
| 2012/0134774 A1* | 5/2012 | Clark | B65D 51/14 |
| | | | 415/9 |
| 2018/0258852 A1* | 9/2018 | Heeter | F02C 7/045 |

FOREIGN PATENT DOCUMENTS

| | | |
|---|---|---|
| EP | 3372805 | 9/2018 |
| WO | 2001034469 | 3/2011 |

OTHER PUBLICATIONS

European Patent Office; Partial European Search Report dated Feb. 7, 2022 in Application No. 21195790.7.

\* cited by examiner

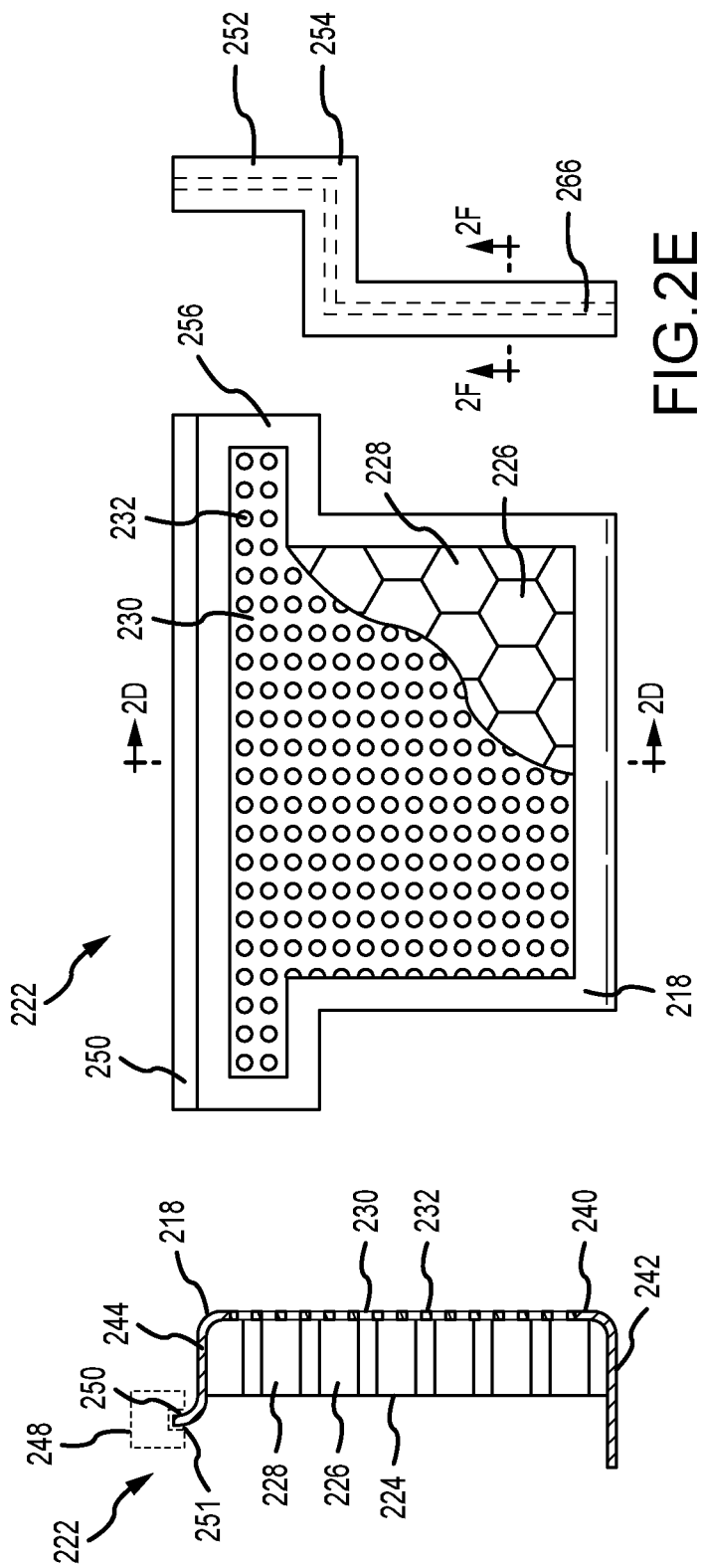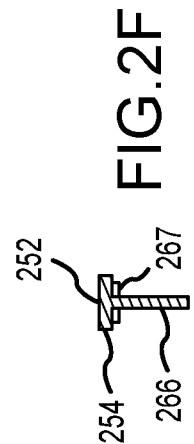

ACOUSTIC ATTENUATION STRUCTURES

CROSS-REFERENCE TO RELATED APPLICATIONS

This application is a non-provisional application claiming priority to U.S. Prov. Appl. 63/077,234, entitled "ACOUSTIC ATTENUATION STRUCTURES," filed on Sep. 11, 2020, the entirety of which is hereby incorporated by reference herein for all purposes.

FIELD

The present disclosure relates generally to acoustic attenuation structures for reducing noise propagating through ducts and, more particularly, to acoustic panels or liners for reducing noise emitted from gas turbine engines for aircraft.

BACKGROUND

Gas turbine engines or propulsion systems for aircraft typically include a fan section, a compressor section, a combustor section and a turbine section that are generally enclosed by a nacelle structure. Air entering the compressor section is compressed and delivered into the combustor section where it is mixed with fuel and ignited to generate a high-speed exhaust gas flow. The high-speed exhaust gas flow expands through the turbine section to drive the compressor section and the fan section.

During operation, the propulsion systems generate noise that requires attenuation and control. The noise generated during operation comprises a spectrum consisting of many different frequencies and power levels, some of which contribute disproportionately more noise to the overall emitted noise. Accordingly, the propulsion systems are generally provided with noise attenuation structures, including acoustic panels or liners. Ideally, the noise attenuation structures will reduce or eliminate noise of all frequencies generated within the propulsion system. However, practical limitations reduce the efficient attenuation of noise at some frequencies in favor of noise at other frequencies. For these reasons, noise attenuation structures are typically tuned or tailored to attenuate the most undesirable frequencies with the greatest efficiency, though such structures generally require compromises that limit the effective attenuation of noise at other or less undesirable frequencies.

Conventional acoustic liners or panels include a cellular structure sandwiched between a back sheet and a face sheet including a plurality of openings. The openings create aerodynamic drag on the propulsion system during operation. Attachment mechanisms used to attach the acoustic structures to portions of the propulsions systems, such as on the inner surfaces of the nacelle also create aerodynamic drag during operation. The drag inhibits overall propulsion system performance. Accordingly, it is desirable to design and develop a noise attenuation structures that exhibit reduced drag and increased noise attenuation.

SUMMARY

An acoustic structure for a gas turbine engine is disclosed. In various embodiments, the acoustic structure includes a cellular structure having a plurality of cells; and a housing configured to house the cellular structure, the housing including a first rail configured for attachment to a static structure within the gas turbine engine and a second rail configured for attachment to the static structure.

In various embodiments, the first rail includes an aperture configured to receive a fastener for attachment to the static structure. In various embodiments, the aperture is removed from exposure to a bypass flow path. In various embodiments, the second rail includes a hook for attachment to the static structure. In various embodiments, the hook is removed from exposure to the bypass flow path. In various embodiments, the second rail is a forward rail with respect to a longitudinal axis extending through the gas turbine engine. In various embodiments, the second rail extends a circumferential distance with respect to a longitudinal axis extending through the gas turbine engine and the hook extends along at least a portion of the circumferential distance.

In various embodiments, the acoustic structure further includes a first edge retainer configured to secure a first side of the housing to the static structure. In various embodiments, the acoustic structure further includes a second edge retainer configured to secure a second side of the housing to the static structure. In various embodiments, the first edge retainer and the second edge retainer include an upper rail configured to engage the housing. In various embodiments, the first edge retainer and the second edge retainer include a center rail configured to engage the static structure. In various embodiments, a pad is disposed between the upper rail of the first edge retainer and the first side of the housing.

A gas turbine engine is disclosed. In various embodiments, the gas turbine engine includes a nacelle; an engine case; and a first acoustic structure, the first acoustic structure including a cellular structure having a plurality of cells, and a housing configured to house the cellular structure, the housing including a first rail configured for attachment to the engine case and a second rail configured for attachment to the engine case.

In various embodiments, the gas turbine engine further includes a first edge retainer configured to secure a first side of the housing to the engine case and a second edge retainer configured to secure a second side of the housing to the engine case. In various embodiments, the first edge retainer and the second edge retainer include an upper rail configured to engage the housing and the first edge retainer and the second edge retainer include a center rail configured to engage the engine case.

In various embodiments, the first rail includes an aperture configured to receive a fastener for attachment to the engine case and the aperture is removed from exposure to a bypass flow path. In various embodiments, the second rail includes a hook for attachment to the engine case and the hook is removed from exposure to the bypass flow path. In various embodiments, at least one of the first edge retainer and the second edge retainer is configured to conform to a surface of an exit guide vane or to a base element to which the exit guide vane is mounted.

A method of installing an acoustic liner within an inner barrel of a nacelle structure is disclosed. In various embodiments, the method includes the steps of: providing an acoustic liner having flexible properties; manipulating the acoustic liner to have a characteristic dimension that is reduced in size from an installed configuration; positioning the acoustic liner at the installed location within the inner barrel; expanding the acoustic liner to its installed configuration; and fastening the acoustic liner to the inner barrel with no fastening structures or portions thereof extending radially inward of the acoustic liner and into the flow path entering the inner barrel of the nacelle structure.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 2A, 2B, 2C, 2D, 2E, 2F and 2G are schematic illustrations of an acoustic structure in the form of an acoustic panel for an outer surface of an engine case, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
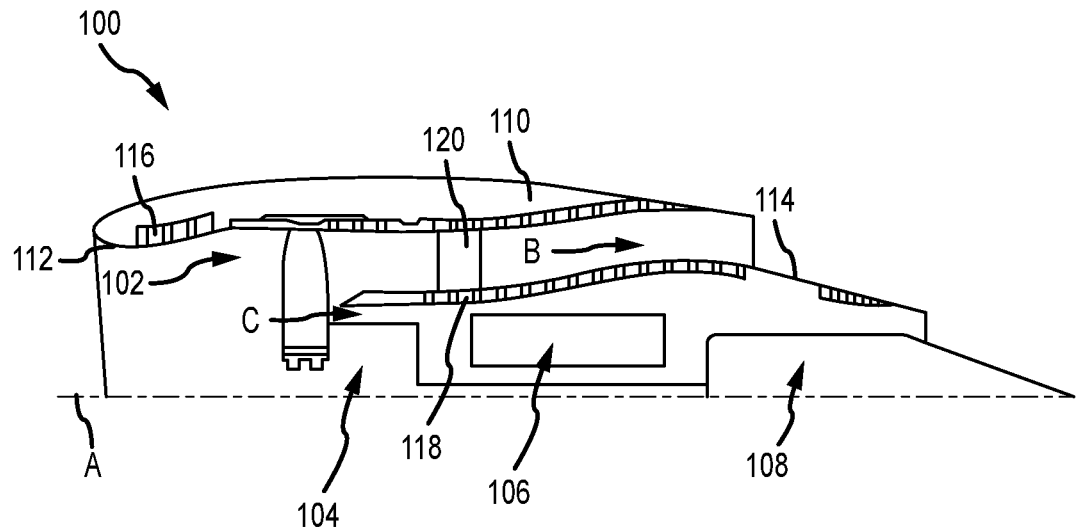
FIG. 1A is a schematic representation of a gas turbine engine, in accordance with various embodiments.

Referring now to the drawings, FIG. 1A schematically illustrates a gas turbine engine 100, in accordance with various embodiments. The gas turbine engine 100 generally incorporates a fan section 102, a compressor section 104, a combustor section 106 and a turbine section 108 disposed axially along a longitudinal axis A. The fan section 102 drives air along a bypass flow path B in a bypass duct defined within a nacelle 110, while the compressor section 104 drives air along a primary or core flow path C for compression and communication into the combustor section 106 and then expansion through the turbine section 108. Operation of the gas turbine engine 100 produces noises of various frequencies and at such power levels that noise attenuation is required. An inner surface 112 of the nacelle 110 directs airflow into and around the fan section 102 and the compressor section 104. The inner surface 112 of the nacelle 110 and an outer surface 114 of the engine case include various noise attenuation structures, such as, for example, an acoustic liner 116 that extends about the inner surface 112 of the nacelle 110 forward of the fan section 102 and an acoustic panel 118 that covers the outer surface 114 of the engine case in the vicinity of an exit guide vane 120. Various other acoustic liners and acoustic panels may be positioned and installed at various other locations of the gas turbine engine 100. The attenuation structures are typically positioned in desired locations for reducing the harshest of the noise generated by the gas turbine engine 100.

Figure 1B:
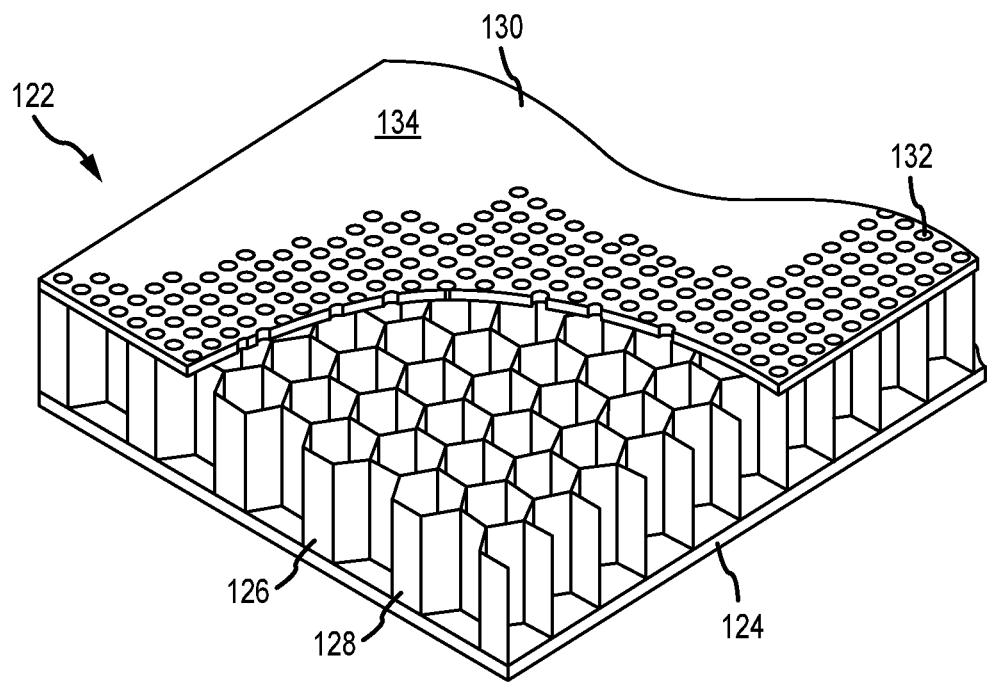
FIG. 1B is a schematic representation of an acoustic structure, in accordance with various embodiments.

Referring now to FIG. 1B, an acoustic structure 122 (representative of the structure of the acoustic liner 116 and the acoustic panel 118) includes a back plate 124 that supports a cellular structure 126. The cellular structure 126 includes a plurality of cells 128 covered by a face sheet 130. The face sheet 130 includes a plurality of perforations or openings 132 to communicate acoustic waves or energy to the cellular structure 126. The face sheet 130 may be constructed of metal, plastic, composites or other materials. A surface 134 of the face sheet 130 is configured to blend in with and be a part of the inner surface 112 of the nacelle 110 or the outer surface 114 of the engine case, both of which are configured and constructed to minimize aerodynamic drag. As described in further detail below, the configuration of the face sheet 130 is also fabricated to minimize drag by minimizing or eliminating attachment structure (e.g., rivets, bolts or brackets) that would otherwise extend into the bypass flow path B.

Referring now to FIGS. 2A, 2B, 2C, 2D, 2E, 2F and 2G, various components of an acoustic structure 222 (or a first acoustic structure or first acoustic structure assembly) for an outer surface of an engine case are illustrated, in accordance with various embodiments. The acoustic structure 222 includes an acoustic panel 218 having a structure similar to the acoustic panel 118 described above with reference to FIGS. 1A and 1B. In various embodiments, the acoustic panel 218 includes a cellular structure 226 having a plurality of cells 228 sandwiched between a back plate 224 and a face sheet 230, with the face sheet 230 including a plurality of perforations or openings 232 to communicate acoustic waves or energy to the cellular structure 226.

Figure 2A:
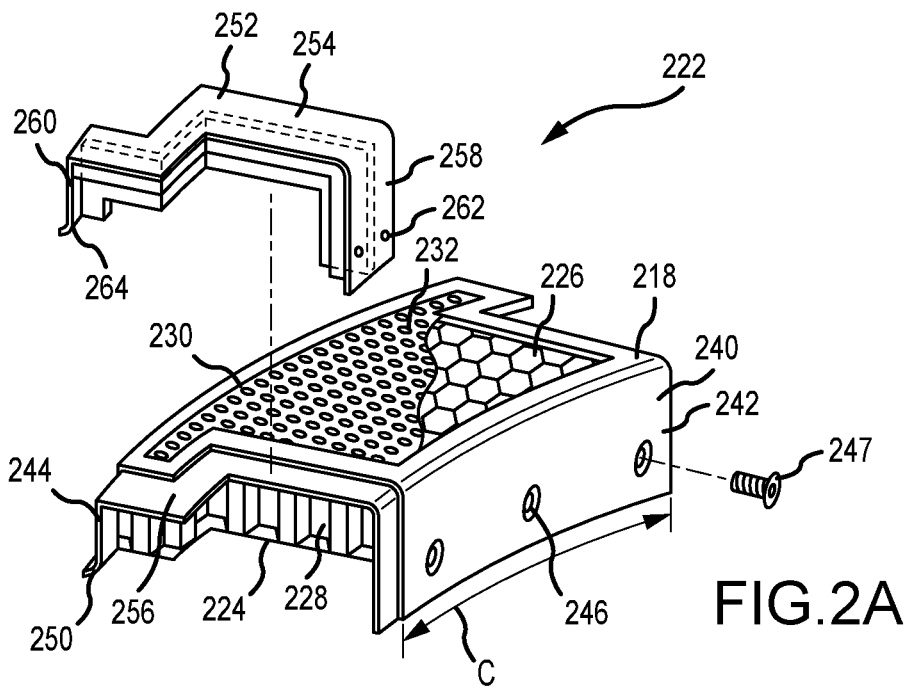
Figure 2B:
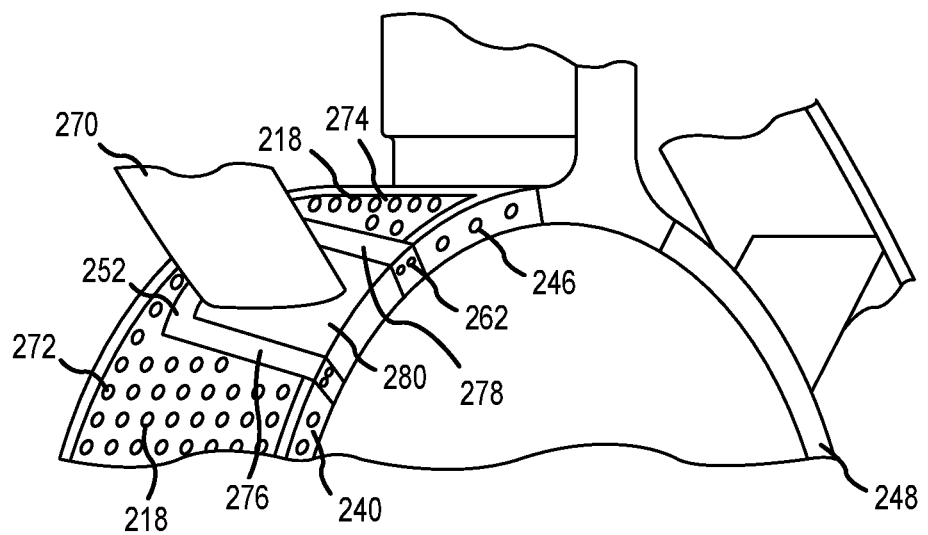

The cellular structure 226 is disposed within a housing 240 formed by an aft rail 242 (or a first rail) and a forward rail 244 (or a second rail), spaced a distance from the aft rail 242, together with the back plate 224 and the face sheet 230. The aft rail 242 and the forward rail 244 typically extend a circumferential distance C about a longitudinal axis (e.g., the longitudinal axis A illustrated in FIG. 1A). In various embodiments, the aft rail 242 includes an aperture 246 (or a plurality of apertures) configured to receive a fastener 247 (e.g., a bolt or screw) that functions to secure the acoustic panel 218 to a static structure, such as, for example, an engine case 248 (as illustrated in FIG. 2B). In various embodiments, the forward rail 244 includes a hook 250 that extends along at least a portion or the entirety of the length of the forward rail 244. The hook 250 may be configured to fit within an opening (e.g., a slotted opening 251) in the static structure, thereby enabling the forward rail 244 to be secured to the static structure via the hook 250 and the aft rail 242 to be secured to the static structure via the fastener 247.

The acoustic panel 218 may be further secured to the static structure via an edge retainer 252. In various embodiments, the edge retainer 252 includes an upper rail 254 that is configured to secure to the static structure an edge 256 of the acoustic panel 218 that runs along the face sheet 230 along a side length of the of the acoustic panel 218. Similar to the housing 240, the edge retainer 252 includes an aft rail 258 (or a first rail) and a forward rail 260 (or a second rail), spaced a distance from the aft rail 258. In various embodiments, the aft rail 258 includes an aperture 262 (or a plurality of apertures) configured to receive a fastener (e.g., the fastener 247) that functions to secure the edge retainer 252 to the static structure. In various embodiments, the forward rail 260 includes a hook 264 that extends along at least a portion of the forward rail 260. The hook 264 may be configured to fit within an opening (e.g., a slotted opening) in the static structure, thereby enabling the forward rail 260 to be secured to the static structure via the hook 264 and the aft rail 258 to be secured to the static structure via the fastener 247. The edge retainer 252 may also include a center rail 266 that runs along a center portion of the upper rail 254. The center rail 266 functions to stiffen the edge retainer and also function, in various embodiments, to enclose the sides of the cellular structure 226. In various embodiments, the center rail 266 may also engage (e.g., abut or be fastened to) the static structure along a length of the center rail 266.

In various embodiments, a pad 267 runs along at least a portion of a distance between the aft rail 258 and the forward rail 260. The pad 267 provides a seal, for example, against fluids leaking from internal regions of the static structure to external regions of the static structure; similarly, the pad provides a seal against fluid leaking from external regions of the static structure to internal regions of the static structure. For example, the pad 267 provides a seal against fluids within the core flow path from leaking into the bypass flow path, or vice versa, where the static structure is the engine case 248. The pad 267 also provides a structure configured to damp various natural or resonant frequencies that occur in the vicinity of the acoustic panel 218. In various embodiments, the pad 267 is constructed using a silicone material or the like.

Focusing now on FIG. 2B, the acoustic panel 218 is illustrated on either side of an exit guide vane 270 extending radially outward from the engine case 248. More specifically, a first acoustic panel 272 is positioned on a first side of the exit guide vane 270 and a second acoustic panel 274 is positioned on a second side of the exit guide vane 270. In similar fashion, a first edge retainer 276 is positioned between the first acoustic panel 272 and a base element 280 of the exit guide vane 270 and a second edge retainer 278 is positioned between the second acoustic panel 274 and the base element 280. Installation of the acoustic panels and the edge retainers proceeds as described above. First, the hook 250 extending forward of each the acoustic panels is inserted into a corresponding slot within the engine case, followed by securing the aft rail 258 via the fastener 247. The same process is used to install the edge retainers. The result is a uniform surface extending about the exit guide vane 270 that has no fastening structures or portions thereof extending radially outward of the acoustic panels or edge retainers and into the bypass flow path, thereby providing a smooth surface that is less amenable to generating noise.

Figure 2G:
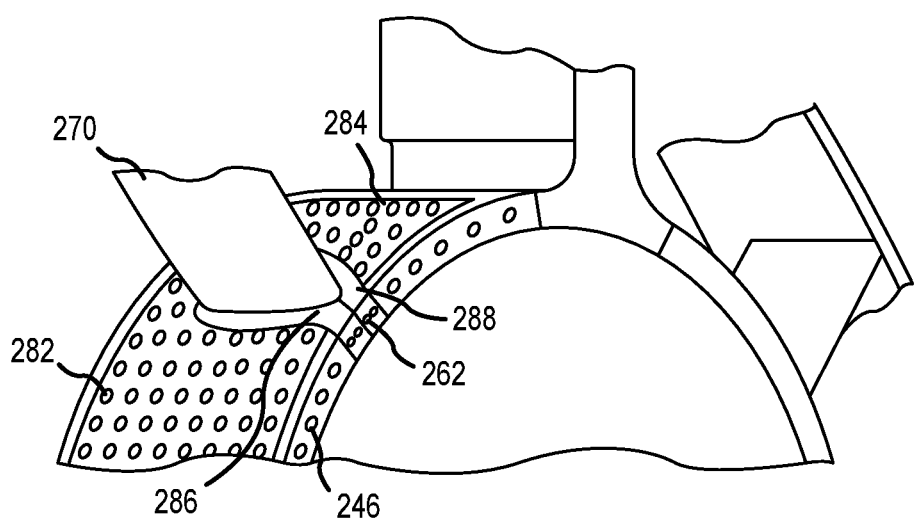

Finally, referring to FIG. 2G, a modified embodiment of the acoustic panel 218 illustrated in FIG. 2B is provided. More specifically, a first acoustic panel 282 is positioned on a first side of the exit guide vane 270 and a second acoustic panel 284 is positioned on a second side of the exit guide vane 270; the exit guide vane 270 may be considered a static structure, similar to the engine case 248 described above. In similar fashion, a first edge retainer 286 is positioned between the first acoustic panel 282 and the exit guide vane 270 and a second edge retainer 288 is positioned between the second acoustic panel 284 and the exit guide vane 270. Installation of the first and second acoustic panels and the edge retainers proceeds as described above. The main difference between the embodiments illustrated in FIGS. 2B and 2G, is the latter embodiment enables increased surface area of the acoustic structure by configuring the sides of the first edge retainer 286 and the second edge retainer 288 to conform to the sides of the exit guide vane 270. The result, again, is a uniform surface extending about the exit guide vane 270 that has no fastening structures or portions thereof extending radially outward of the acoustic panels or edge retainers and into the bypass flow path, thereby providing a smooth surface that is less amenable to generating noise, with the surface area of the acoustic structure being increased or maximized over the former embodiment illustrated in FIG. 2B.

Figure 3A:
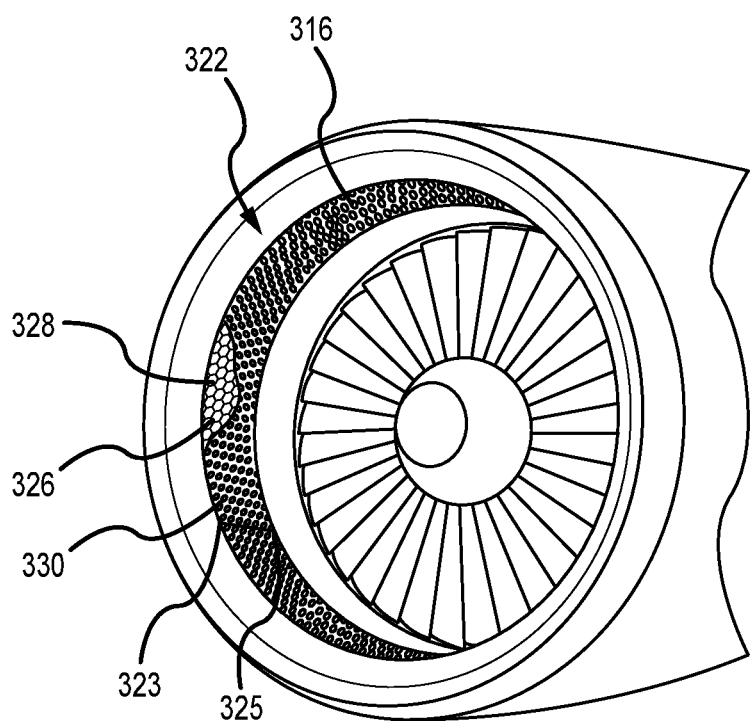
FIGS. 3A, 3B and 3C are schematic illustrations of an acoustic structure in the form of an acoustic liner for an inner surface of a nacelle, in accordance with various embodiments.
Figure 3B:
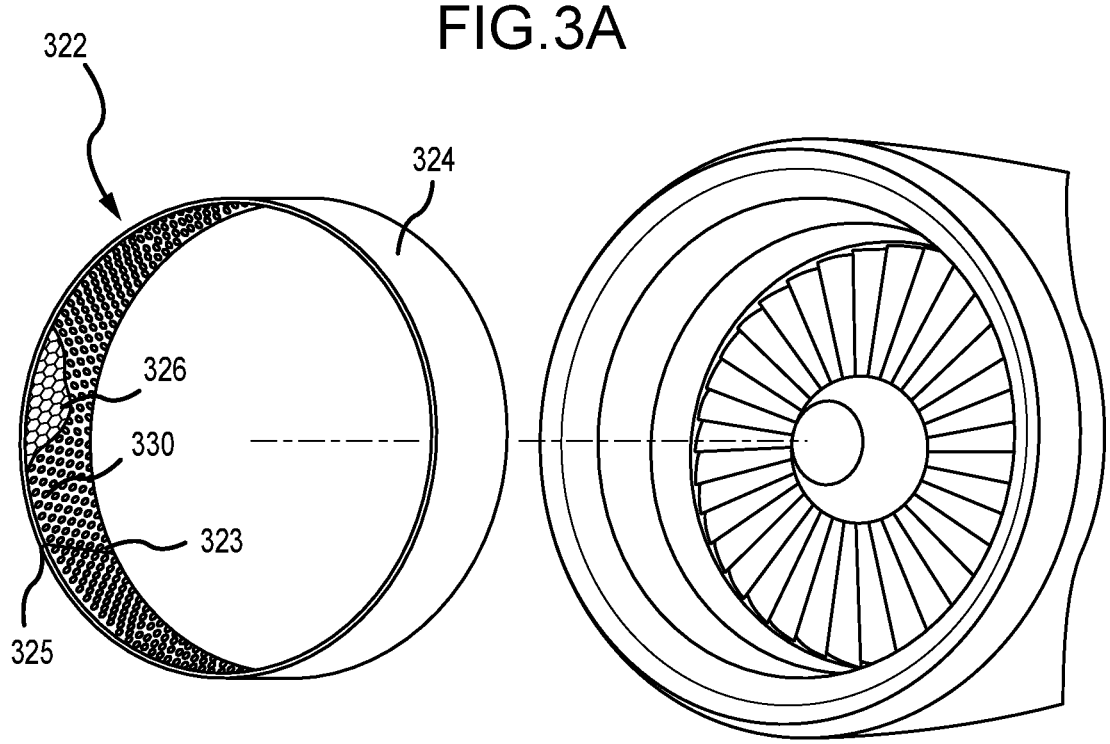
Figure 3C:
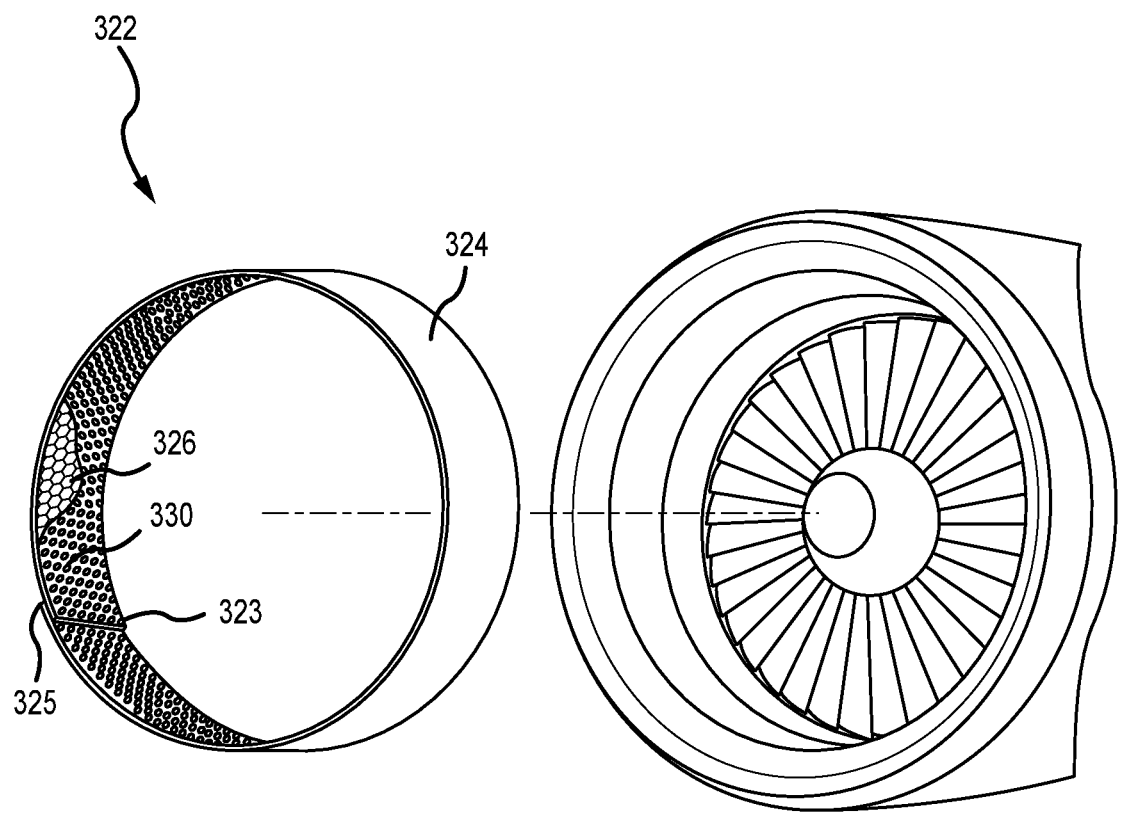

Referring now to FIGS. 3A, 3B and 3C, various components of an acoustic structure 322 (or a second acoustic structure or second acoustic structure assembly) for an inner surface of a nacelle are illustrated, in accordance with various embodiments. The acoustic structure 322 includes an acoustic liner 316 having a structure similar to the acoustic liner 116 and the acoustic panel 118 described above with reference to FIGS. 1A and 1B. In various embodiments, the acoustic liner 316 includes a cellular structure 326 having a plurality of cells 328 sandwiched between a back plate 324 and a face sheet 330, with the face sheet 330 including a plurality of perforations or openings to communicate acoustic waves or energy to the cellular structure 326. In various embodiments, the acoustic liner 316 is constructed of polymeric materials—e.g., via an additive manufacturing process—that provide a degree of flexibility to the acoustic liner 316, enabling the acoustic liner 316 to be manipulated or distorted in shape during installation.

In various embodiments, the acoustic liner 316 comprises a single, non-segmented structure or a single component structure configured to extend three hundred sixty degrees (360°) about the inner surface. As illustrated in the figures, the acoustic liner 316 has a first end 323 and a second end 325 that are configured to abut one another (or abut an insert positioned between the first end 323 and the second end 325) at a common location when installed within a nacelle structure. In various embodiments, as illustrated in FIG. 3C, the acoustic liner 316 is configured such that the first end 323 and the second end 325 may overlap one another, thereby reducing the size of the outer circumference a sufficient amount to position the acoustic liner 316 within the nacelle structure. Once positioned within the nacelle structure, the acoustic liner 316 expands to assume its operational circumference, at which the first end 323 and the second end 325 abut one another. One positioned inside the nacelle structure, the back plate 324 may be secured to the nacelle structure using fasteners or similar manner of attachment. The result is a uniform surface extending about the inner surface of the nacelle structure that has no fastening structures or portions thereof extending radially inward of the acoustic liner and into the flow path entering the fan, thereby providing a smooth surface that is less amenable to generating noise. While the acoustic liner 316 is described as a single, non-segmented structure configured to extend three hundred sixty degrees (360°) about the inner surface, the disclosure contemplates shorter segments (e.g., 180° segments) constructed in the same fashion and having the same flexible properties that allow for installation without having to disassemble the nacelle.

Figure 4:
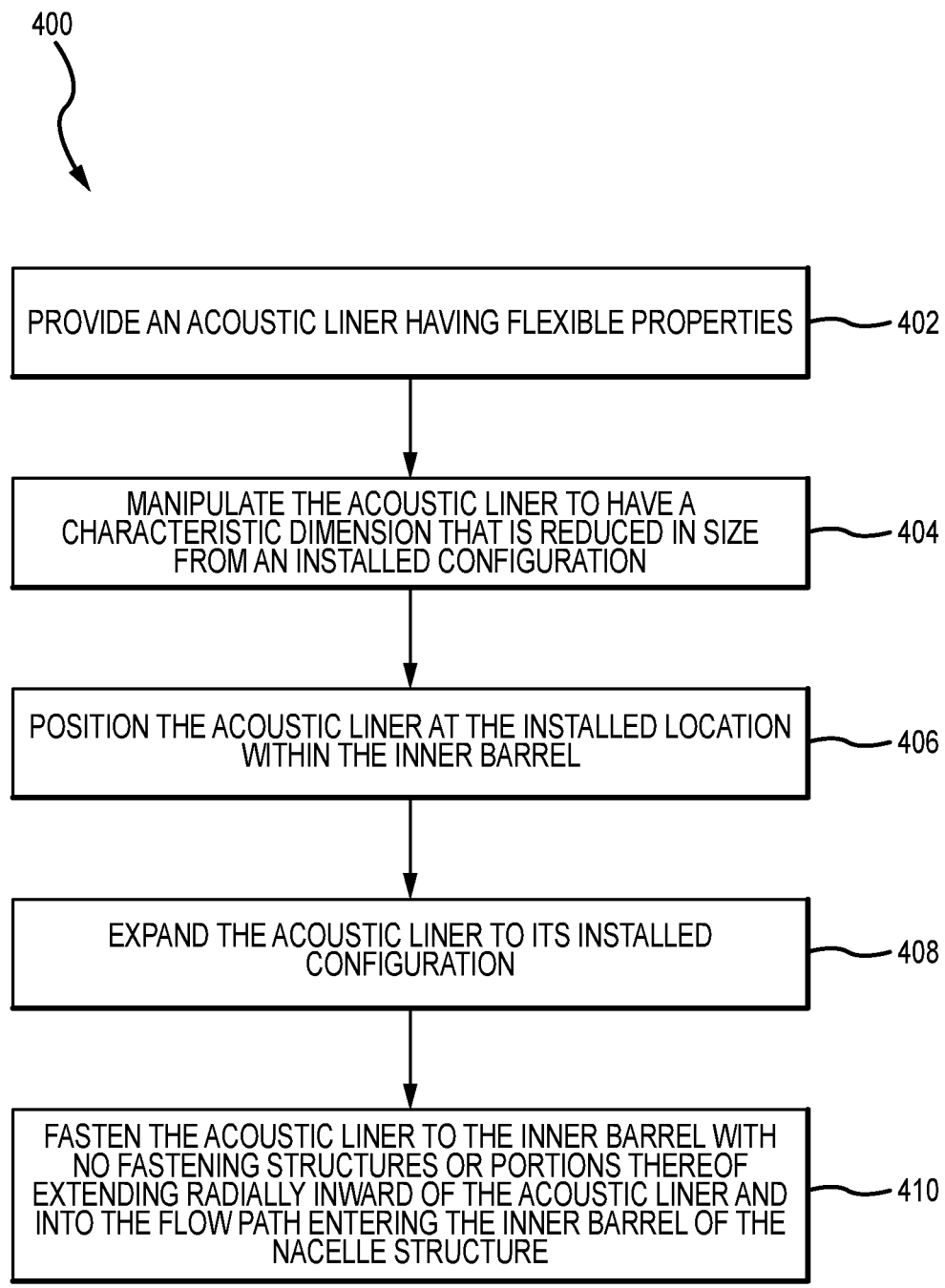
FIG. 4 describes various steps employed with a method of installing an acoustic liner within an inner barrel of a nacelle structure, in accordance with various embodiments.

Referring now to FIG. 4, and with continued reference to FIG. 3, a method 400 of installing an acoustic liner within an inner barrel of a nacelle structure is described. A first step 402 includes providing an acoustic liner (e.g., the acoustic liner 316 or two one hundred eight degree (180°) segments that may comprise the acoustic liner 316) having flexible properties. A second step 404 includes manipulating the acoustic liner to have a characteristic dimension (e.g., a diameter or circumference) that is reduced in size from an installed configuration. A third step 406 includes positioning the acoustic liner at the installed location within the inner barrel. A fourth step 408 includes expanding the acoustic liner to its installed configuration. A fifth step 410 includes fastening the acoustic liner to the inner barrel with no fastening structures or portions thereof extending radially inward of the acoustic liner and into the flow path entering the inner barrel of the nacelle structure.

The foregoing disclosure provides a practical means for maximizing the operational area of acoustic structures in the form of acoustic panels and liners. The increased area operational will increase the amount of noise reduction available in a given space and thus optimize the configuration. In various embodiments, the increase in operational areas is accomplished by removing obstructions (e.g., fastening structures in the case of panels or inserts disposed between the ends of adjacently positioned liners) from extending into the adjacent flow paths, thereby minimizing local disturbances, smoothing aerodynamic surfaces and reducing drag and increasing efficiency. A reduction of the number of edges of arc segment liners used on the inner surfaces of nacelle structures also provides more treatment area for a given configuration and reduces the noise effects driven by the axial (parallel to centerline) breaks in current acoustic liners for nacelle structures. Other benefits include a reduction in the number of fasteners required and in the maintenance time and cost to install or remove the acoustic structures.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An acoustic structure for a gas turbine engine, comprising:
   a cellular structure having a plurality of cells; and a housing configured to house the cellular structure, the housing including:
    a first rail configured for attachment to a static structure within the gas turbine engine;
    a second rail configured for attachment to the static structure; and
    a first edge retainer configured to secure a first side of the housing to the static structure, the edge retainer including an aperture configured to receive a fastener that functions to secure the edge retainer to the static structure, wherein the first edge retainer is configured to conform to at least one of a surface of an exit guide vane or a base element to which the exit guide vane is mounted, the first edge retainer being positioned between the cellular structure and at least one of the exit guide vane or the base element and extending along a side length of the cellular structure.

2. The acoustic structure of claim 1, wherein the first rail includes an aperture configured to receive a fastener for attachment to the static structure.

3. The acoustic structure of claim 2, wherein the aperture is removed from exposure to a bypass flow path.

4. The acoustic structure of claim 3, wherein the second rail includes a hook for attachment to the static structure.

5. The acoustic structure of claim 4, wherein the hook is removed from exposure to the bypass flow path.

6. The acoustic structure of claim 5, wherein the second rail is a forward rail with respect to a longitudinal axis extending through the gas turbine engine.

7. The acoustic structure of claim 5, wherein the second rail extends a circumferential distance with respect to a longitudinal axis extending through the gas turbine engine and the hook extends along at least a portion of the circumferential distance.

8. The acoustic structure of claim 1, further comprising a second edge retainer configured to secure a second side of the housing to the static structure.

9. The acoustic structure of claim 8, wherein the first edge retainer and the second edge retainer include an upper rail configured to engage the housing.

10. The acoustic structure of claim 9, wherein the first edge retainer and the second edge retainer include a center rail configured to engage the static structure.

11. The acoustic structure of claim 10 further comprising a pad disposed between the upper rail of the first edge retainer and the first side of the housing.

12. The acoustic structure of claim 11, wherein the first rail includes an aperture configured to receive a fastener for attachment to the static structure and the aperture is removed from exposure to a bypass flow path.

13. The acoustic structure of claim 12, wherein the second rail includes a hook for attachment to the static structure and the hook is removed from exposure to the bypass flow path.

* * * * *